his Patent Office  3,402,049
Patented Sept. 17, 1968

3,402,049
PROCESS FOR PREPARING LOW FAT
POTATO CHIPS
John J. Mancuso, Astoria, and Anthony C. Capossela,
North Tarrytown, N.Y., assignors to General Foods
Corporation, White Plains, N.Y., a corporation of
Delaware
No Drawing. Filed Nov. 2, 1964, Ser. No. 408,395
4 Claims. (Cl. 99—100)

ABSTRACT OF THE DISCLOSURE

Potato chips having a total fat content of 20% to 30% by weight are prepared by soaking raw potato slices in an edible fat, draining the potato slices to remove excess fat and subjecting the potato slices to an elevated temperature to surface-fry and dehydrate the potato slices.

The present invention relates to potato chips, and more particularly to a stable potato chip having a reduced fat content and to a process for preparing such a potato chip.

In the present specification, the term "fat" is to be understood as including both edible fats and oils.

In the conventional production of potato chips, whole potatoes after having been conditioned to lower their sugar content, are peeled, trimmed, sliced, deep fat fried and salted to yield the final edible potato chip. The so-formed potato chips absorb a considerable quantity of fat and their final fat content ranges from about 35% to about 45% based on the total weight of the potato chip.

This high fat content is undesirable for many reasons. For example, it increases the total caloric content of the potato chip making such a product objectionable to persons wishing to lose weight or to avoid weight gain. The deep fat frying process shortens the shelf stability of the potato chip. Moreover, the frying process is difficult to control and often results in excessively cooked potato chips. A low fat content chip cannot be made with deep fat frying processes and the fat content cannot be controlled as fat is absorbed throughout the frying operation.

It is, therefore, an object of the present invention to provide a potato chip of reduced fat content. Another object of the present invention is to provide a potato chip having increased stability and shelf life. A further object is to prepare a potato chip of reduced caloric content. Still another object is to provide a method for preparing potato chips of controlled fat content. A still further object is o produce a method for preparing potato chips which eliminates undesirable deep fat frying practices. These and other objects of the present invention will become apparent as the description proceeds.

It has now been found that an improved, stable potato chip of reduced fat content may be prepared by soaking raw potato slices in an edible fat at about room temperature, after which the fat soaked raw potato slices are drained and subjected to heat to accomplish surface frying and moisture removal to yield potato chips.

The potato slices are prepared by any suitable means. Slices of any size may be used but conventional size slices having a thickness of from about 0.045 inch to about 0.060 inch are preferred.

Any edible fat or oil which does not crystallize at the soaking temperatures of the present invention may be used. Specific examples of suitable soaking fats are, for instance, olive oil, peanut oil, corn oil, coconut oil, refined cottonseed oil, soybean oil, sesame oil, and blends of any two or more of the foregoing. The slices may be soaked in fat at room temperature or somewhat above room temperature but preferably below the gelatinization temperature of potato starch. The useful fat soaking temperature range varies with the fat being used and with the effect of heat on the potato slices. The lower temperature limit will generally be about 70° F. Somewhat higher temperatures may be required if the fat is not fluid at about room temperature. In general, the preferred upper temperature for soaking according to the present invention will not exceed about 125° F. As the temperature rises the raw potato slices tend to cook, and to lose normal turgidness, thereby becoming difficult to handle.

The quantity of fat which is absorbed into the potato slice depends upon the length of time the slices are soaked. A longer soaking time causes greater absorption while a shorter soaking time causes less absorption.

After having been soaked, the potato slices are treated to remove excess fat or oil by any suitable means, e.g., by draining, and are then heated. The heating of the fat soaked potato slice may take place by oven heating, forced air drying, or any other suitable means of heating. The potato slices are heated at temperatures of from about 225° F. to about 350° F. The heating is continued until the soaked potato slices achieve a desirable degree of browning. Preferably, the heating is continued until the browning is equal to that associated with conventional deep fat fried potato chips. The heating period may last for from about 10 minutes to about one hour. Less heating is required at higher temperatures and more heating is required at lower temperatures. The thus prepared potato chip after salting is similar in taste and appearance to deep fat fried potato chips but is lower in caloric content due to its reduced fat content and, moreover, has a greater shelf life.

The following example illustrates the present invention without, however, limiting the same thereto.

Whole fresh Russet variety potatoes were peeled, trimmed and sliced to a thickness of about 0.060 inch. The raw slices were then washed in cold water to remove surface starch. After washing, the raw potato slices were dried of excess surface water and immersed in Durkex 500, a stabilized hydrogenated vegetable oil consisting of a blend of soybean oil and cottonseed oil, manufactured by Glidden Co., which had been heated to about 100° F. This slight heating of the oil was necessary to liquify small particles of solid shortening which were dispersed in the otherwise clear oil. The temperature was maintained a 100° F. during the soaking. The washed raw potato slices were divided into three batches which were soaked respectively, for 5, 10 and 15 minutes in the slightly heated oil. After the oil soaking period, the potato slices were removed, drained of excess oil and placed on dryer screens. The screens were placed in a forced air dryer, a Youngs Brothers dryer, operating at 315° F. to 325° F. for approximately 10 minutes. During this period surface frying occurred, the moisture content was reduced and desirable browning (toasting) took place. In order to limit the total browning which occurred in the chips, the partially dried chips were then transferred to a dryer operating at 250° F. and drying was continued for 20 to 30 minutes. The lower dryer temperature dried off most of the remaining moisture without causing excess browning. The resulting potato chips were then salted. They were similar in appearance, texture and eating quality to conventionally prepared deep fat fried potato chips.

The following table lists the relationship of final fat and moisture content to soaking time:

TABLE 1

| Soaking Time, minutes | Percent Fat or Oil (Dry Basis) in Finished Chip | Percent Moisture |
|---|---|---|
| 5 | 23.3 | 3.7 |
| 10 | 24.9 | 3.8 |
| 15 | 27.3 | 3.9 |

Whereas conventional deep fat frying yields potato chips which contain an average of about 40% fat, it is seen that the present invention provides poato chips having substantially reduced fat or oil content. While deep fat fried potato chips will generally become rancid after about 6 to 8 weeks, potato chips prepared according to the present invention have been found to be free of rancidity after storage for one year at ambient conditions.

What is claimed is:

1. A process for preparing a stable potato chip which comprises soaking raw potato slices in a material selected from the group consisting of edible fats and oils for a time sufficient to impart a final content of said material of from about 20% to about 30% by weight at temperatures which do not exceed the gelatinization temperature of potato starch, removing the soaked potato slices from the material, and drying them at temperatures of from about 225° F. to about 350° F. until the desired degree of browning is achieved.

2. A process according to claim 1 wherein the temperature of the soaking material is about room temperature.

3. A process for preparing a stable potato chip which comprises soaking raw potato slices in a material selected from the group consisting of edible fats and oils for a time sufficient to impart a final content of said material of from about 20% to about 30%, the temperature of said material not exceeding the gelatinization temperature of potato starch, draining said material from the potato slices, and drying the soaked potato slices at a temperature of from about 225° F. to about 350° F. until the desired degree of toasting is achieved.

4. A process according to claim 3 wherein the temperature of the soaking material is from about 70° F. to about 125° F.

References Cited

UNITED STATES PATENTS 3,127,271  3/1964  Goulston _____ 99—100
3,244,538  4/1966  Kaehler _____ 99—100

ALVIN E. TANENHOLTZ, *Primary Examiner.*

D. M. NAFF, *Assistant Examiner.*